(12) United States Patent
Saunders et al.

(10) Patent No.: US 10,492,645 B2
(45) Date of Patent: Dec. 3, 2019

(54) INLINE SPIRALIZING FOOD PROCESSOR

(71) Applicant: Spectrum Brands, Inc., Middleton, WI (US)

(72) Inventors: James Stuart Saunders, Madison, WI (US); Joseph Valdon Krebs, Madison, WI (US); Rolando Antonio Cavazos Jimenez, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 5 days.

(21) Appl. No.: 15/443,929

(22) Filed: Feb. 27, 2017

(65) Prior Publication Data

US 2017/0251880 A1  Sep. 7, 2017

Related U.S. Application Data

(60) Provisional application No. 62/302,938, filed on Mar. 3, 2016.

(51) Int. Cl.
| | |
|---|---|
| *A47J 43/044* | (2006.01) |
| *B26D 1/43* | (2006.01) |
| *B26D 7/06* | (2006.01) |
| *B26D 3/11* | (2006.01) |
| *A47J 43/07* | (2006.01) |

(Continued)

(52) U.S. Cl.
CPC ......... *A47J 43/044* (2013.01); *A47J 43/0711* (2013.01); *A47J 43/0722* (2013.01);
(Continued)

(58) Field of Classification Search
CPC .. Y10T 83/2216; Y10S 83/932; A47J 43/044; A47J 43/0711; A47J 43/0722;
(Continued)

(56) References Cited

U.S. PATENT DOCUMENTS

| | | | | |
|---|---|---|---|---|
| 4,628,808 A | * | 12/1986 | Simon ...................... | B26D 3/11 99/537 |
| 5,138,940 A | | 8/1992 | Geissler et al. | |

(Continued)

FOREIGN PATENT DOCUMENTS

| | | |
|---|---|---|
| CN | 102038438 | 5/2011 |
| EP | 2957200 | 12/2015 |

(Continued)

OTHER PUBLICATIONS

International Search Report and Written Opinion for International application No. PCT/US2017/019577 dated May 11, 2017 (10 pages).

*Primary Examiner* — Phong H Nguyen
(74) *Attorney, Agent, or Firm* — Kagan Binder, PLLC

(57) ABSTRACT

The invention described herein is directed to an inline spiral cutting food processor that includes a motor that rotates an upper positioned disc with a blade assembly by means of a belt or gear assembly or mechanism. The entrance and exit chute are fixed and positioned in-line with the axis of rotation of the blade supporting disc member. The entrance chute is positioned above the cutting disc, and the exit opening (or chute) is below. During operation a food item is pushed down the entrance chute as the blade rotates and cuts it. Cut food falls down through the opening or exit chute into a storage container or jar. The food cutting assembly is configured to generate spiral or helical food from vegetables.

18 Claims, 5 Drawing Sheets

(51) Int. Cl.
*B26D 3/22* (2006.01)
*B26D 5/08* (2006.01)

(52) U.S. Cl.
CPC ............... *B26D 1/43* (2013.01); *B26D 3/11* (2013.01); *B26D 3/22* (2013.01); *B26D 5/086* (2013.01); *B26D 7/0641* (2013.01); *A47J 2043/04454* (2013.01); *Y10S 83/932* (2013.01)

(58) Field of Classification Search
CPC ... A47J 2043/04454; B26D 1/43; B26D 3/11; B26D 3/22; B26D 5/086; B26D 7/0641
See application file for complete search history.

(56) References Cited

U.S. PATENT DOCUMENTS

| | | |
|---|---|---|
| 5,197,681 A | 3/1993 | Liebermann |
| 5,216,031 A | 6/1993 | Dobson et al. |
| 5,921,485 A | 7/1999 | Plavcan et al. |
| 5,992,287 A | 11/1999 | Dube |
| 7,520,453 B2 * | 4/2009 | Clapp ................. A47J 43/0772 241/282.1 |
| D725,343 S | 3/2015 | Rogers et al. |
| 9,089,987 B2 | 7/2015 | Walker et al. |
| D742,091 S | 11/2015 | Rogers et al. |
| 2011/0030522 A1 | 2/2011 | Barnes |
| 2011/0177191 A1 | 7/2011 | Gimmler et al. |
| 2013/0087032 A1 | 4/2013 | Walker et al. |
| 2017/0057110 A1 * | 3/2017 | Guo ....................... B26D 5/086 |

FOREIGN PATENT DOCUMENTS

| | | |
|---|---|---|
| FR | 2942985 | 9/2010 |
| WO | 2003099527 | 4/2003 |

* cited by examiner

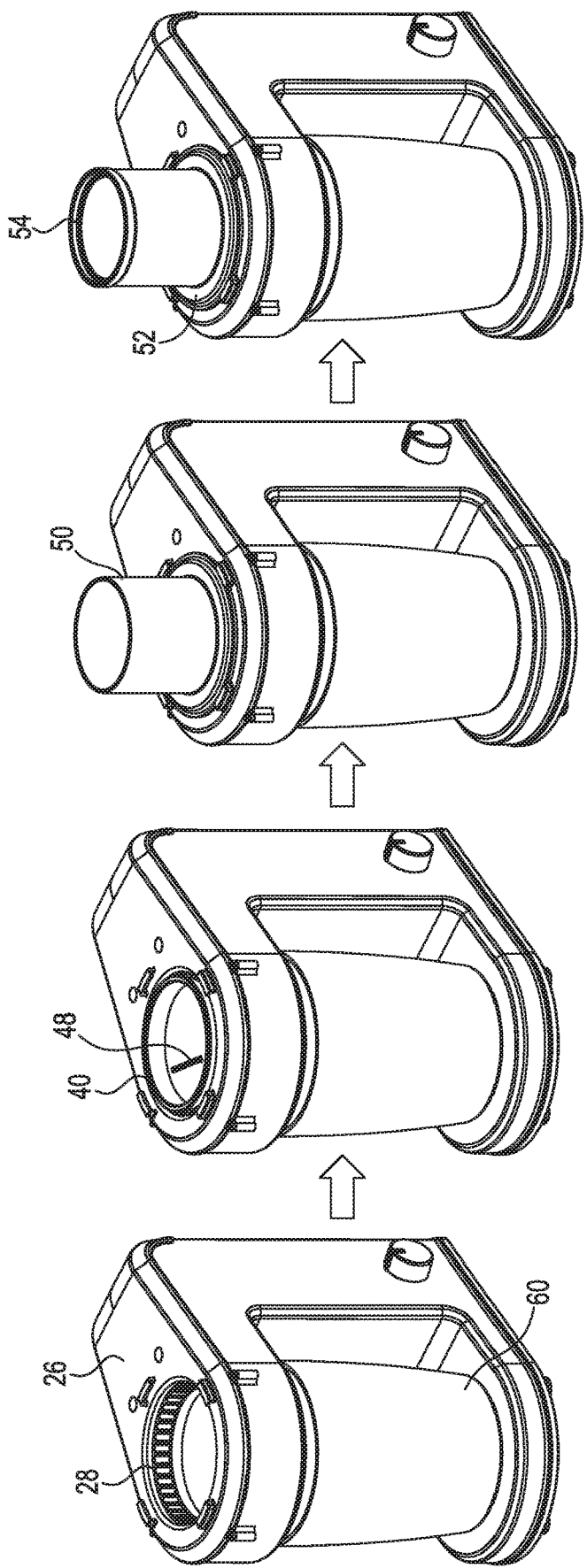

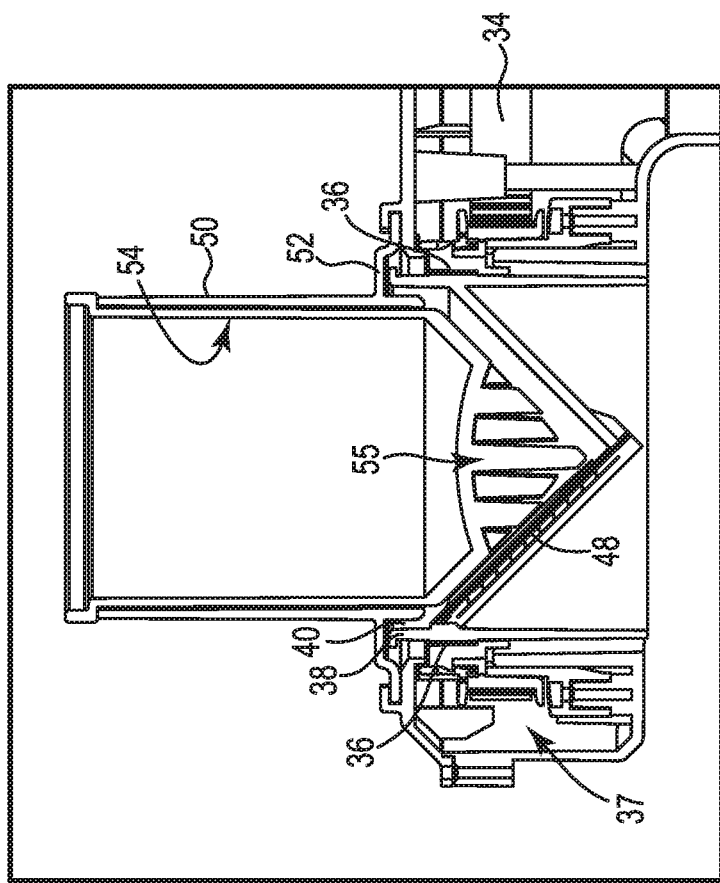
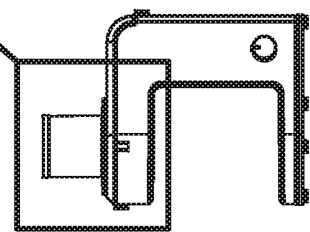

INLINE SPIRALIZING FOOD PROCESSOR

CLAIM OF PRIORITY

This application claims priority to and the benefit of a U.S. Provisional Application with Ser. No. 62/302,938, filed on Mar. 3, 2016, which is incorporated herein by reference in its entirety.

FIELD AND BACKGROUND OF THE INVENTION

The invention described herein relates to food processing devices and to electromechanical spiral and helical cutting appliances and devices.

There are food processing apparatus of the type having a working bowl or jug or jar with a motor-driven shaft projecting vertically upwards through the bottom of the bowl. Various selected rotary tools can be engaged on and driven by the shaft for performing many different food processing operations as may be desired by the user. A detachable cover or lid is usually secured over the top of the bowl during use. The cover typically includes a chute or feed tube which has a mouth that opens downwardly through the cover into the top of the bowl. The food items to be prepared or processed may be placed in the chute and then are manually pushed down through the top chute passed the blade and into the bowl by means of a removable pusher or plunger member which is adapted to slide down into the inlet chute in the manner of a plunger. For further information and an example about this type of food preparing apparatus reference is made to U.S. Pat. No. 5,921,485.

One type of food preparation is the cutting of vegetables, such as a tomato into slices or onions in to slices or into a diced form with some of these appliances being well suited for slicing a cucumber, carrot or potato into slices of uniform thickness. However, one of the challenges has been to cut these vegetables into spiral or helical forms with the use of an automatic food processor. The more inexpensive options provided to date have been mechanical or hand-cranked spiraling cutters but these take up counter or shelf space, are slow and require additional time for cleaning. Examples of appliances dedicated to forming helical or spiral vegetables are shown in U.S. Pat. Nos. 5,138,940 and 5,216,031 but are time consuming to use as the appliance can only process one vegetable (potato, cucumber, etc.) at a time. Specifically, the motor, which is located at the top as part of the cover, uses a drive disc that is attached to the food item to be spiraled and then the motor spins the vegetable over a stationary blade. Each time a food item has to be spiraled the top cover with the motor has to be removed and the next food item is then loaded onto the drive disc and then processed. It would therefore be advantageous to have an appliance that would provide for automatic spiraling or helical cutting of vegetables using an automated food processor configuration that is easy to use and clean after each use.

SUMMARY

In various example embodiments, there are provided inline food processing appliances that greatly simplify the spiralizing of vegetables or the forming of helical foods. In one example embodiment, a tower configuration provides for an electric motor located in an upper portion of the tower which also houses a rotating cutting disc with a blade member fixed thereon. An inlet chute is located above the cutting disc and the spiraled food exits below the cutting disc and into a jar as the motor rotates the cutting disc by means of a belt or a gear mechanism or configuration. In one example embodiment, the blade member is affixed to a conical or concave cylindrical disc support member, which includes an opening for the spiraled food, as the leading blade edge travels around a rotational axis. The inlet chute or entrance and exit are fixed (above and below) and positioned in line with the axis of rotation of the disc. During operation, the food item is pushed down (using a plunger or a pusher member) into the inlet chute as the cutting disc blade rotates and cuts the food item. Cut or spiraled food falls down underneath or through an optional exit chute into a jar or storage container located underneath.

In one example embodiment, there is provided a food processor that includes a food processor tower having a base, an upright structure extending vertically from the base and a top frame member disposed on the upright structure, the top frame member including a distal portion extending laterally away from the upright structure and parallel with the base, the distal portion including a top frame opening extending therethrough, wherein the upright structure of the tower includes a motor and a drive shaft configured to drive a rotating member and a rotation translational accessory when a motor control switch actuates the motor. The food processor also includes a cylindrical blade support member located in the top frame opening of the tower, the cylindrical blade support member having an upper rim and a concave portion extending down from the upper rim, the cylindrical blade support member including an elongate opening in the concave portion extending down from the upper rim and an elongate blade member disposed adjacent the elongate opening; a coupling member and bearing assembly disposed about the top frame opening and adapted to receive the cylindrical blade support member, the coupling member adapted to be engaged with the cylindrical blade support member and rotated axially about the bearing assembly by the rotation translational accessory operatively coupled to the rotating member when the motor is actuated. Further, the food processor includes a chute member disposed over the cylindrical blade support member and having a lower rim portion operatively engaged with the top frame member.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DESCRIPTION OF THE DRAWINGS

Other important objects and advantages of the invention will be apparent from the following detailed description of the invention taken in connection with the accompanying drawings in which:

FIGS. 2A-2D illustrate perspective views of assembling steps and the various components of the improved food processing assembly of the invention;

FIGS. 3A-3C illustrate cross-sectional views of the cutting disc blade support member disposed inside the tower of the food processing assembly along with a rotating assembly of the invention.

DETAILED DESCRIPTION OF THE INVENTION

Figure 1B:
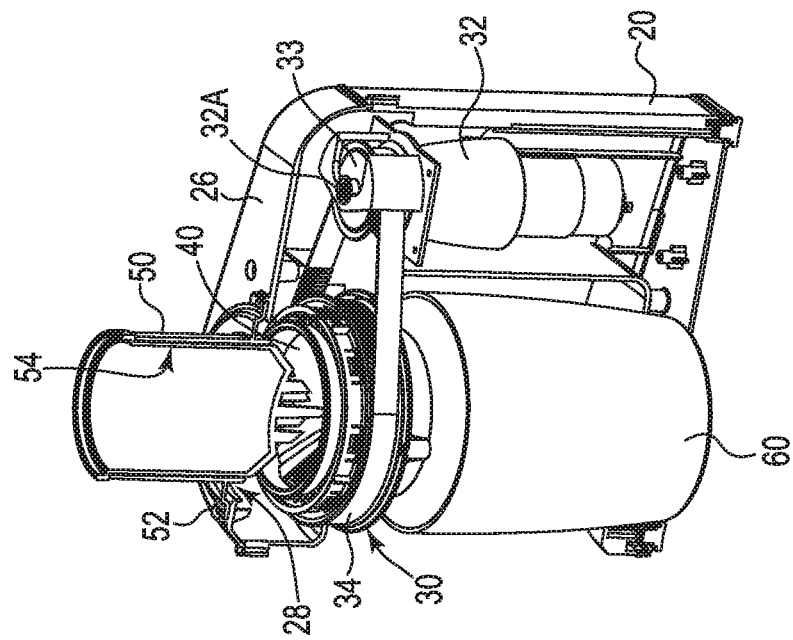
FIGS. 1A-1B illustrate perspective and cutaway views of an improved food processing assembly including a tower, a chute and cutting assembly and a jar in accordance with the invention.
Figure 1A:
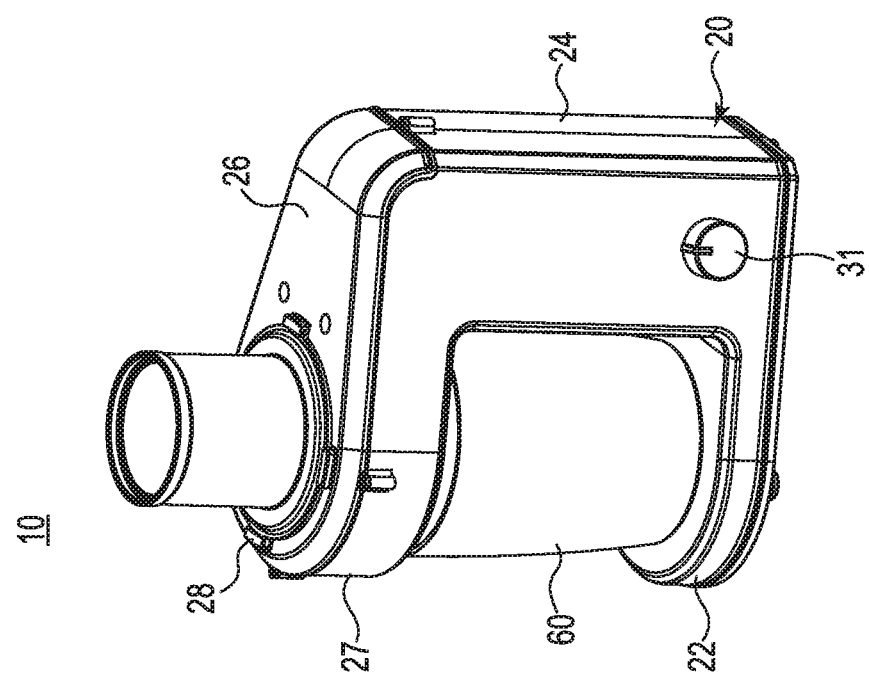

The following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring now to the figures, FIGS. 1A-4B illustrate an inline food processing assembly 10 for forming spiraled or helical foods according to the invention. In particular, a food processor 10 includes a food processor tower 20 having a base 22, an upright structure 24 extending vertically from base 22 and a top frame member 26 disposed on upright structure 24. In this example embodiment, top frame member 26 includes a distal portion 27 that extends laterally away from upright structure 24 and is parallel with base 22. Distal portion 27 includes a top frame opening 28 that extends down through the top frame member 26 and to a stop rim 29. Upright structure 24 of tower 20 includes a motor assembly 30 that includes a motor 32 and a drive shaft 32A that drives a rotating member 33 and a rotation translational accessory 34 (such as a belt or band in this example embodiment) when a motor control switch 31 actuates motor 32.

In this example embodiment, food processor 10 also includes a cylindrical blade support member or cutting disc 40 that is located in top frame opening 28 of tower 20 and has a cylindrical body 42 and an upper rim 44 and a concave or conical portion 46 that extends down from upper rim 44. In this example embodiment, cylindrical blade support member 40 includes an elongate opening 47 in concave portion 46 extending down from upper rim 44 and an elongate blade member 48 disposed adjacent elongate opening 47. In order to facilitate the rotation of blade support member 40, tower 20 includes a coupling member and a bearing assembly 37 disposed about top frame opening 28 that receives cylindrical blade support member 40. In this example embodiment, assembly 37 includes a coupling member 38 that engages with cylindrical blade support member 40 and rotates axially about a bearing 36 by a rotation translational accessory 34, such as the drive belt, that is operatively coupled to rotating member 33 when motor 32 is actuated.

In this example embodiment, food processor 10 further includes a chute member 50 disposed over cylindrical blade support member 40 and includes a lower rim portion 52 designed to be operatively engaged with top frame member 26 to facilitate a safety interlock arrangement when chute member 50 is twisted or rotated to lock the lower rim portion onto top frame member 26. Food processor 10 also includes a jar 60 (or other collection vessel such as a bowl or plate) that disposed under opening 28 of top frame member 26 and located on base 22. In this example embodiment, food processor 10 includes a plunger or pusher member 54 located concentrically within chute member 50 that pushes a food item down into chute member 50 against a spinning cylindrical blade support member 40 when motor 32 is actuated. In this example embodiment, plunger member 54 includes at a distal end 55 a formed surface, such a pointed tip or a tip with protruding members, configured to engage a food item above and against the rotating cylindrical blade support member 40.

Figure 3C:
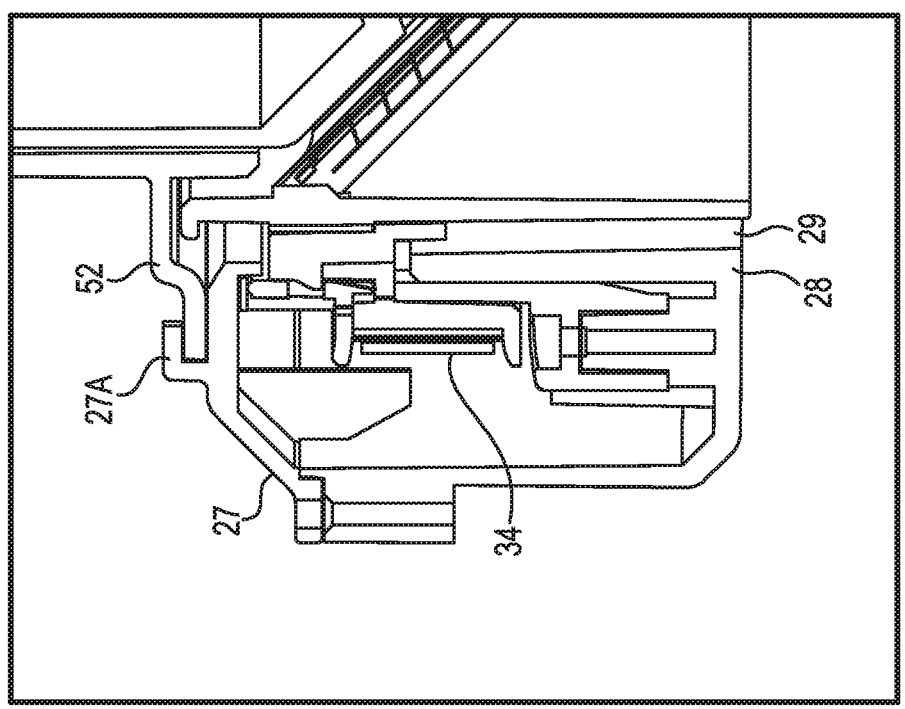
Figure 4B:
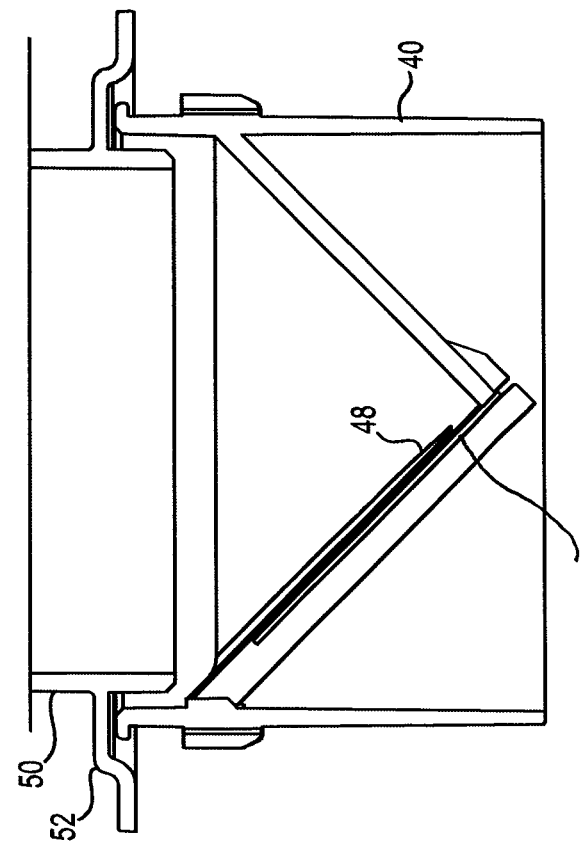
FIGS. 4A-4B illustrate perspective and side cutaway views of the food spiraling cylindrical blade support member by itself and with the inlet chute in accordance with the invention.
Figure 4A:
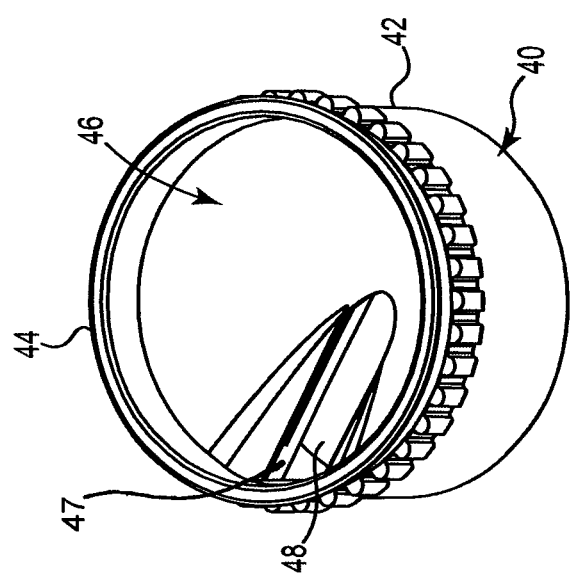

Referring briefly to FIGS. 1B, 3A and 3C, in this example embodiment, rotation translational accessory 34 includes a band or belt disposed about coupling member 38 that engages cylindrical blade support member 40, the band or belt engaged on an opposite end with rotating member 33 of drive shaft 32A so as to axially rotate the coupling member 38 and blade support member 40 when motor 32 is actuated by motor control switch 31. In this example embodiment, motor 32 and drive shaft assembly 32A are configured to rotate cylindrical support blade member 40 in at least one of a continuous rotating mode and a pulsating mode, depending on the user's choice. In a related example embodiment, blade member 48 of blade support member 40 is also comprised of at least one of a slicing blade assembly, a shredding blade assembly, a grating blade assembly and a dicing blade assembly, where minor modifications are made to the cutting disc surface of the blade member to accommodate these other blade assemblies. In yet another related embodiment, blade support member 40 is flat and not conical in shape to support other blade assemblies as described above.

In a related embodiment, rotation translational accessory 34 includes a gear mechanism or configuration on an external periphery of coupling member 38 that engages with rotating member 33 of drive shaft 32A and axially rotates the coupling member and cylindrical blade support member when motor 32 is actuated.

In a related embodiment, a food processing assembly is provided that includes a food processor tower having a base, an upright structure extending vertically from the base and a top frame member disposed on the upright structure, the top frame member including a distal portion extending laterally away from the upright structure and parallel with the base, the distal portion including a top frame opening extending therethrough. The upright structure of the tower includes a motor and a drive shaft configured to drive a rotating member and a rotating accessory when a motor control switch actuates the motor. The food processing assembly includes a cylindrical blade support member located in the top frame opening of the tower, the cylindrical blade support member having a blade member disposed therein, and includes a coupling member and bearing assembly disposed about the top frame opening and adapted to receive the cylindrical blade support member, the coupling member adapted to be engaged with the cylindrical blade support member and adapted to be rotated axially about the bearing assembly when the motor is actuated by the rotating accessory operatively coupled to the rotating member. The food processing assembly further includes a chute member disposed over the cylindrical blade support member and having a lower rim portion operatively engaged with the top frame member and a plunger member located concentrically within the chute member and adapted to push a food item in the chute member against the cylindrical blade support member when the motor is actuated. Finally, the food processing assembly further includes a jar (or other collection vessel) that is disposed under the opening of the top frame member and located on the base of the tower for collecting the spiraled food. Depending on the application, the jar may be a non-locking or locking type to the tower and tower frame member.

The following patents and publications are incorporated by reference in their entireties: U.S. Pat. Nos. 5,138,940; 5,216,031; 9,089,987; and US Publication 2011/0030522.

The foregoing specific embodiments of the present invention as set forth in the specification herein are for illustrative purposes only. Various deviations and modifications may be made within the spirit and scope of the invention without departing from the main theme thereof.

What is claimed is:

1. A food processor comprising:
    a food processor tower having a base, an upright structure extending vertically from the base and a top frame member disposed on the upright structure, the top frame member including a distal portion extending laterally away from the upright structure and over the base, the distal portion including a top frame opening extending through a thickness of the distal portion of the top frame member, the upright structure of the tower includes a motor and a drive shaft configured to drive a rotating member and a rotation translational accessory when a motor control switch actuates the motor;
    a cylindrical blade support member removably supported within the top frame opening of the tower, the cylindrical blade support member having a cylindrical body extending from an upper rim to a lower rim by a distance at least equal to the thickness of the distal portion of the top frame member and a concave portion extending down from the upper rim, the cylindrical blade support member including an elongate opening extending along the concave portion and an elongate blade member disposed adjacent the elongate opening;
    a coupling member and bearing assembly disposed about the top frame opening, the bearing assembly connected with the top frame member, the coupling member removably engaged with the cylindrical blade support member so that the coupling member and the cylindrical blade support member can be driven together and rotated axially about the bearing assembly by the rotation translational accessory operatively coupled to the rotating member when the motor is actuated; and
    a chute member disposed over the cylindrical blade support member and having a lower rim portion operatively engaged with the top frame member.

2. The food processor of claim 1 wherein the rotation translational accessory includes a band or belt disposed about the coupling member that engages the cylindrical blade support member, the band or belt engaged with the rotating member of the drive shaft so as to axially rotate the coupling member and blade support member when the motor is actuated.

3. The food processor of claim 1 wherein the rotation translational accessory includes a gear mechanism on an external periphery of the coupling member that engages with the rotating member of the drive shaft and axially rotates the coupling member and cylindrical blade support member when the motor is actuated.

4. The food processor of claim 1 wherein the chute member twists to lock the lower rim portion of the chute member onto the top frame member.

5. The food processor of claim 1 further comprising a jar disposed under the opening of the top frame member and located on the base.

6. The food processor of claim 1 further comprising a plunger member located concentrically within the chute member and adapted to push a food item in the chute member against the cylindrical blade support member when the motor is actuated.

7. The food processor of claim 6 wherein the plunger member at a distal end includes a formed surface adapted to engage a food item above the cylindrical blade support member.

8. The food processor of claim 1, wherein the motor and drive shaft assembly are configured to rotate the cylindrical support blade member in one of a continuous rotating mode and a pulsating mode.

9. The food processor of claim 1, wherein the top frame opening is a cylindrical opening that includes a stop rim at a distal end to maintain the cylindrical blade support member within the cylindrical opening.

10. The food processing assembly of claim 1, wherein the motor and drive shaft assembly are configured to rotate the cylindrical blade support member in at least one of a continuous rotating mode and a pulsating mode.

11. A food processing assembly comprising:
    a food processor tower having a base, an upright structure extending vertically from the base and a top frame member disposed on the upright structure, the top frame member including a distal portion extending laterally away from the upright structure and parallel with the base, the distal portion including a top frame opening extending through a thickness of the distal portion of the top frame member, wherein the upright structure of the tower includes a motor and a drive shaft configured to drive a rotating member and a rotating accessory when a motor control switch actuates the motor;
    a cylindrical blade support member removably supported within the top frame opening of the tower, the cylindrical blade support member having a cylindrical body extending from an upper rim to a lower rim by a distance at least equal to the thickness of the distal portion of the top frame member, the cylindrical blade support member also having a blade member disposed therein extending along the concave portion;
    a coupling member and bearing assembly disposed about the top frame opening, the bearing assembly connected with the top frame member, the coupling member removably engaged with the cylindrical blade support member so that the coupling member and the cylindrical blade support member can be driven together and rotated axially about the bearing assembly by the rotation translational accessory operatively coupled to the rotating member when the motor is actuated;
    a chute member disposed over the cylindrical blade support member and having a lower rim portion operatively engaged with the top frame member; and
    a plunger member located concentrically within the chute member and adapted to push a food item in the chute member against the cylindrical blade support member when the motor is actuated.

12. The food processing assembly of claim 11 wherein the cylindrical blade support member includes a concave portion extending down from the upper rim in a conical shape, the cylindrical blade support member including an elongate opening in the concave portion extending down from the upper rim and an elongate blade member disposed adjacent the elongate opening.

13. The food processing assembly of claim 11 further comprising a jar disposed under the opening of the top frame member and located on the base.

14. The food processing assembly of claim 11 wherein the plunger member at a distal end includes a formed surface adapted to engage a food item above the cylindrical blade support member.

15. The food processing assembly of claim 11 wherein the chute member twists to lock the lower rim portion of the chute member onto the top frame member.

16. The food processing assembly of claim 11 wherein the rotation translational accessory includes a band or belt disposed about the coupling member that engages the cylindrical blade support member, the band or belt engaged with the rotating member of the drive shaft so as to axially rotate the coupling member and blade support member when the motor is actuated.

17. The food processing assembly of claim 11 wherein the rotation translational accessory includes a gear mechanism on an external periphery of the coupling member that engages with the rotating member of the drive shaft and axially rotates the coupling member and cylindrical blade support member when the motor is actuated.

18. The food processing assembly of claim 11, wherein the top frame opening is a cylindrical opening that includes a stop rim at a distal end to maintain the cylindrical blade support member within the cylindrical opening.

\* \* \* \* \*